United States Patent [19]

van Ouwerkerk et al.

[11] 4,036,774

[45] July 19, 1977

[54] FRAGRANT SOAP COMPOSITIONS CONTAINING ALPHA-SUBSTITUTED ACETALDEHYDE AND KETONE

[75] Inventors: Anton van Ouwerkerk, Livingston, N.J.; Bernard J. Chant, Rye; Arthur L. Liberman, Beechhurst, both of N.Y.

[73] Assignee: International Flavors & Fragrances Inc., New York, N.Y.

[21] Appl. No.: 741,141

[22] Filed: Nov. 11, 1976

Related U.S. Application Data

[62] Division of Ser. No. 601,727, Aug. 4, 1975.

[51] Int. Cl.² .................. C11B 9/00; C11D 3/50; C11D 9/44
[52] U.S. Cl. ................... 252/132; 252/89 R; 252/108; 252/522
[58] Field of Search .............. 252/89, 132, 134, 108, 252/522

[56] References Cited

U.S. PATENT DOCUMENTS

| | | | |
|---|---|---|---|
| 2,957,933 | 10/1960 | Pommer et al. | 260/598 |
| 3,929,895 | 12/1975 | Hall | 260/586 R |
| 3,956,393 | 5/1976 | Pittet | 260/598 |
| 3,980,708 | 9/1976 | Pittet | 260/598 |

FOREIGN PATENT DOCUMENTS

| | | | |
|---|---|---|---|
| 780,489 | 4/1968 | Canada | 252/522 |

*Primary Examiner*—Dennis L. Albrecht
*Attorney, Agent, or Firm*—Arthur L. Liberman; Franklin D. Wolffe

[57] ABSTRACT

Processes and compositions are described for the use in perfume aroma augmenting, modifying, altering and enhancing compositions and as perfume and perfumed article aroma imparting materials of mixtures of (i) 2,2,6-trimethyl-1-cyclohexen-1-ylacetaldehyde (hereinafter referred to as "beta-cyclohomocitral") produced by a process which either (A) comprises the steps of:
i. Oxidizing beta-ionone having the formula:

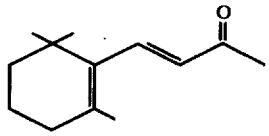

with a peralkanoic acid having the formula:

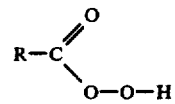

(wherein R is H, methyl or ethyl) in the presence of buffer and in the absence of dimethyl formamide, to form 2,2,6-trimethyl-1-cyclohexen-1-ylvinylacetate (hereinafter referred to as "beta-ionone enol ester") having the formula:

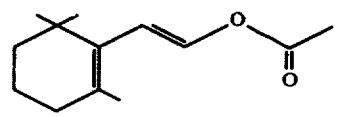

ii. Hydrolyzing said beta-ionone enol ester using a basic hydrolysis agent to form beta-cyclohomocitral having the structure:

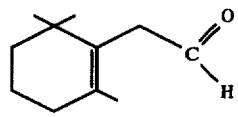

or (B) oxidizing beta-ionone with hydrogen peroxide in the presence of inorganic base to form beta-cyclohomocitral directly, and (ii) one or two phenyl $C_6$ ketone which may be either or both 2,5-dimethyl-5-phenyl hexanone-4 (hereinafter termed "4-damascol") or 2,5-dimethyl-5-phenyl hexen-1-one-4 (hereinafter termed "damascol") having the generic structure:

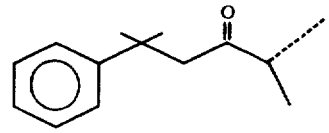

wherein the dashed line represents either a carbon-carbon single bond or a carbon-carbon double bond. Addition of mixtures of beta-cyclohomocitral and one or both phenyl $C_6$ ketones is indicated to modify, augment, impart or enhance in perfumes as well as in perfumed articles rosey, woody, camphoraceous, green and earthy notes.

2 Claims, No Drawings

FRAGRANT SOAP COMPOSITIONS CONTAINING ALPHA-SUBSTITUTED ACETALDEHYDE AND KETONE

This application is a division of U.S. Application for Letters Patent Ser. No. 601,727, filed Aug. 4, 1975.

BACKGROUND OF THE INVENTION

The present invention relates to mixtures of (i) either or both of the phenyl $C_6$ ketones, 2,5-dimethyl-5-phenyl hexanone-4 (hereinafter referred to as "4-damascol") and 2,5-dimethyl-5-phenyl hexen-1-one-3 (hereinafter termed "damascol") and (ii) 2,2,6-trimethyl-1-cyclohexen-1-ylacetaldehyde (hereinafter termed "beta-cyclohomocitral) produced by, interalia, a novel process described and claimed in Application for U.S. Letters Patent Ser. No. 507,414 filed on Sept. 19, 1974, now U.S. Pat. No. 3,956,393 issued May 11, 1976, and Application for U.S. Letters Patent Ser. No. 594,100 filed on July 8, 1975, now U.S. Pat. No. 3,980,708 issued Sept. 14, 1976, and novel compositions using such mixtures of phenyl $C_6$ ketone and beta-cyclohomocitral to alter, modify, enhance (or impart) aromas in (or to) perfumes, perfume compositions and/or perfumed articles.

There has been considerable work performed relating to substances which can be used to impart (or alter, modify or enhance) fragrances to (or in) perfumed compositions, perfumes, or perfumed articles. These substances are used to diminish the use of natural materials, some of which may be in short supply and/or to provide more uniform properties in the finished product. Woody, rosey, camphoraceous, green and earthy notes are desirable in several types of perfume compositions, perfumes and perfumed articles.

Arctander, "Perfume and Flavor Chemicals", 1969 discloses the use in perfume compositions and flavors of "cyclocitral", "dehydro-beta-cyclocitral", "iso-cyclocitral", "alpha-cyclocitrylidene acetaldehyde" and "beta-cyclotrylidene acetaldehyde", thus:

i. "760: CYCLOCITRAL
Alpha-cyclocitral = (2,2,6-trimethyl-5-cyclohexen-1-carboxaldehyde).
Beta-cyclocitral = (2,2,6-trimethyl-6-cyclohexen-1-carboxaldehyde).
Both isomers are known and have been produced separately.

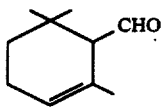 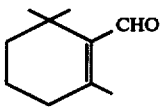

Very rarely offered commercially. These particular cyclocitrals have little or no interest to the creative perfumer, but they have served as part of many pieces of proof that isomers (alpha-beta) do often have different odors."

ii. "761: iso-CYCLOCITRAL
A mixture of two chemicals: 3,5,6-trimethyl-3-cyclohexen-1-carboxaldehyde (meta-cyclocitral).

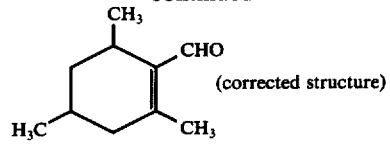

2,4,6-trimethyl-4-cyclohexen-1-carboxaldehyde (symmetric-iso-cyclocitral).

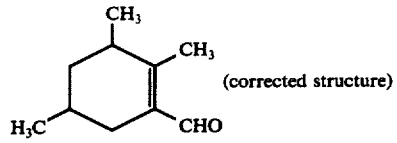

Powerful, and diffusive, foliage-green, "dark" weedy and dry odor, sometimes described as "Flower-shop odor". The earthy and wet-green notes are quite natural in high dilution and resemble the odor of stems from plants and flowers fresh from the soil.

Finds use in perfume compositions where it blends excellently with Oakmoss products (compensates for sweetness and lifts the topnote), with Ionones (freshness), Geranium and Galbanum (enhances the green and "vegetable" notes), etc. ....."

iii. "762: alpha CYCLOCITRYLIDENE ACETALDEHYDE

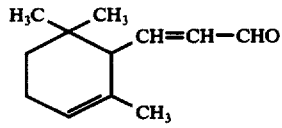

Mild, floral-woody, somewhat oily-herbaceous odor, remotely reminiscent of Rose with similarity to the odor of hydrogenated Ionones.

Suggested for use in perfume compositions. It brings a certain amount of floral lift to Rose compositions, and performs fairly well even in soap. However, the cost of the rarely offered and never readily available lots are rather discouraging to the perfumer, and it is most conceivable that this material can be left out of the perfumer's library without any great loss. ...."

iv. "763: beta-CYCLOCITRYLIDENE ACETALDEHYDE
2,6,6-trimethyl-1-cyclohexenyl-beta-acrolein.

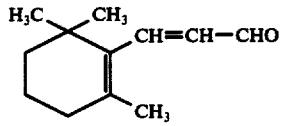

Sweet-woody, rather heavy odor, resembling that of beta-Ionone. More fruity than really floral, but not as tenacious as the Ionone.

Suggested for use in perfume compositions, but since it does not offer any new or unusual odor characteristics, and it cannot be produced in economical competition to beta-Ionone, there is little or no chance that it will ever become a standard shelf ingredient for the perfumer. ...."

v. "869: DEHYDRO-beta-CYCLOCITRAL (Safranal)

2,6,6-trimethyl-4,4-cyclohexadiene-1-carboxaldehyde

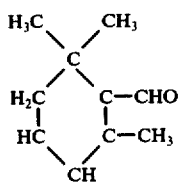

Very powerful, sweet, green-floral and somewhat tobacco-herbaceous odor of good tenacity. In extreme dilution reminiscent of the odor of Safran (Saffron).
Interesting material for fresh topnotes, as a modifier for aldehydic-citrusy notes, as a green-floral topnote in flower fragrances, etc. It blends excellently with the aliphatic Aldehydes, with Oakmoss products and herbaceous oils. ..."

Safranal and beta-cyclocitral are disclosed as volatile constituents of Greek Tobacco by Kimland et al., Phytochemistry 11 (309) 1972. Beta-cyclocitral is disclosed as a component of Burley Tobacco flavor by Demole and Berthet, Helv. Chim. Acta. 55 Fasc-6, 1866 (1972).

THE INVENTION

It has now been discovered that novel perfume compositions and perfumes having highly intense and natural-like rosey notes and novel perfumed articles having intense rosey aromas with, if desired, woody, green and earthy notes may be provided by the utilization of mixtures of (i) one or both of the phenyl $C_6$ ketones, 2,5-dimethyl-5-phenyl hexanone-4 having the structure:

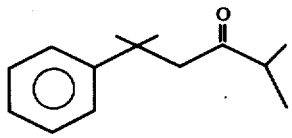

(hereinafter termed "4-damascol") and/or 2,5-dimethyl-5-phenyl hexen-1-one-3 having the structure:

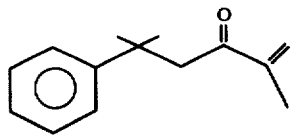

(hereinafter termed "damascol") and (ii) beta-cyclohomocitral having the formula:

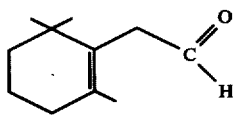

in perfumes, perfumed articles, perfume compositions and colognes.

It has also been discovered by us that the organoleptic effect obtained when using the combination of one or both of the foregoing phenyl $C_6$ ketones and beta-cyclohomocitral is more than merely additive of the individual organoleptic properties of each of the phenyl $C_6$ ketones and beta-cyclohomocitral; that the effect is described as "synergistic".

Generically the structure of the phenyl $C_6$ ketones used in our invention is as follows:

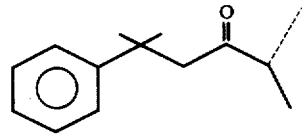

wherein the dashed line may either be a carbon-carbon single bond or a carbon-carbon double bond.

One of the ingredients of the mixture of our invention, the beta-cyclohomocitral may be produced, preferably, by processes which comprises either (A) a reaction carried out in two steps, the first of which is an oxidation reaction of beta-ionone with either performic acid, peracetic acid or perpropionic acid to form beta-ionone enol ester and, secondly, hydrolyzing the beta-ionone enol ester in the presence of base (either aqueous or alcoholic) to form the desired beta-cyclohomocitral or (B) forming beta-cyclohomocitral by oxidizing beta-ionone with hydrogen peroxide in the presence of inorganic base.

More specifically, the process (A) comprises the steps of:

i. Reacting beta-ionone having the formula:

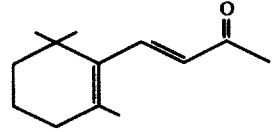

in the absence of dimethyl formamide with a peralkanoic acid having the formula:

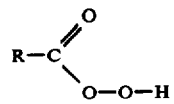

(wherein R is hydrogen, methyl or ethyl) to form beta-ionone enol ester having the formula:

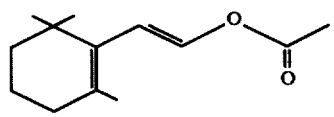

and not the expected beta-ionone epoxide having one of the formulae:

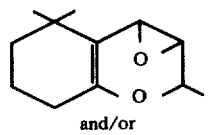

and/or

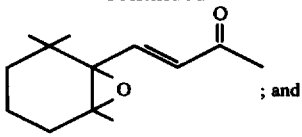
; and ii. hydrolyzing the beta-ionone enol ester in the presence of base (aqueous or alcoholic) to form beta-cyclohomocitral.

Insofar as the oxidation reaction is concerned:

A. where peralkanoic acids are used as the oxidizing agents, the reaction is preferably carried out in the presence of a buffer such as an alkali metal salt of a lower alkanoic acid or an alkali metal carbonate with a lower alkanoic acid such as propionic acid acetic acid or formic acid with the following provisos:

i. The reaction is preferably carried out at temperatures of from 15° C up to about 75° C. Lower temperatures result in slower and less complete reaction and higher temperatures than 75° C result in lower yields of the desired product and significantly higher percentages of by-products. The most preferred temperature of reaction is 25° C.

ii. A slight molar excess (from 10 up to 15 percent) of peracetic acid gives a slightly higher yield of product. A large excess (about 200 percent), however, results in the formation of dihydroactinodiolide having the structure:

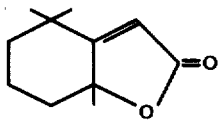

in about 30–35 percent yield when no buffer (e.g., potassium acetate) is present in the reaction mass;

iii. Where potassium carbonate is substituted for potassium acetate as a buffer, the yield of product obtained is substantially the same;

iv. On the other hand, a slightly lower yield of product is obtained by substituting sodium acetate for potassium acetate as the buffer;

v. Substitution of formic acid for acetic acid in the reaction mass gives rise to a lower yield of product.

vi. Any solvent inert to the action of peralkanoic acids may be used in this first oxidation reaction using alkanoic acids. For instance, the use of cyclohexane or chloroform as a solvent does not have an appreciable effect on the yield of product;

vii. Omission of the buffer (i.e., thus performing the reaction under strongly acidic conditions) results in an incomplete reaction, lower yield and greater quantity of by-product(s);

viii. The use of dimethyl formamide as solvent results in the exclusive formation of beta-ionone epoxide having the structure:

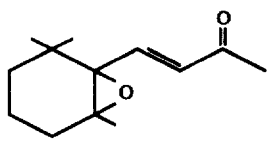

in about 70–75% yield and, accordingly, the presence of dimethyl formamide must be avoided;

ix. The use of monoperphthalic acid (formed in situ from phthalic anhydride and hydrogen peroxide) yields beta-ionone epoxide in 60–70 percent yield. The use of perbenzoic acid in place of a peralkanoic acid has also been used to make beta-ionone epoxide R. Yves, et al., Helv. Chim. Acta, 29, 880 (1946).

It may be concluded that a peralkanoic acid such as peracetic acid in slight excess in the presence of a buffer system preferably composed of acetic acid/potassium acetate is the preferred way to oxidize beta-ionone at 25° C to the corresponding enol acetate.

The beta-ionone enol ester preferably is hydrolyzed by 10 percent alkali metal hydroxide (e.g., potassium hydroxide, lithium hydroxide or sodium hydroxide) in admixture with 50 percent aqueous methanol, although other mild hydrolysis conditions (such as aqueous potassium carbonte, sodium carbonate or lithium carbonate solution) may also be used. As a result of the hydrolysis, beta-cyclohomocitral is formed.

The resultant reaction product, beta-cyclohomocitral may then be refined according to standard techniques, e.g., preparative gas chromatography, extraction, distillation and the like as further exemplified herein.

B. Where hydrogen peroxide (in the presence of inorganic base) is used as the oxidizing agent, the beta-cyclohomocitral is formed in one step from beta-ionone. The strength of hydrogen peroxide used is from about 10 percent up to about 50 percent. The inorganic base used may be an alkali metal hydroxide or alkali metal carbonate such as sodium carbonate, potassium carbonate, lithium carbonate, sodium hydroxide, potassium hydroxide or lithium hydroxide; preferably sodium hydroxide. The mole ratio of hydrogen peroxide:beta-ionone is preferably from about 1.1:1 up to about 3:1.

The aforementioned processes are specific to beta-ionone. As further exemplified infra, when the reaction conditions of this process are applied to alpha-ionone, as opposed to beta-ionone, epoxide formation occurs and neither a substantial amount of enol acetate nor isomers of beta-cyclohomocitral are formed.

The mixtures of the damascol (either "damascol" or "4-damascol") and 2,2,6-trimethyl-1-cyclohexen-1-ylacetaldehyde (or beta-cyclohomocitral) of our invention is capable of supplying certain fragrance notes usually lacking in many perfumery materials, for example, rose and muguet fragrances.

Contemplated within the scope of our invention are weight ratios of damascol (or phenyl $C_6$ ketone):beta-cyclohomocitral of 1:1 up to 5:1. It is, however, preferable in the practice of our invention to use weight ratios of damascol:beta-cyclohomocitral of from about 2:1 up to about 4:1.

When the mixture of the damascol and beta-cyclohomocitral of our invention is used as a perfume arom adjuvant, the nature of the co-ingredients included with the said mixture of damascol and beta-cyclohomcitral in formulating the product composition will also serve to alter the organoleptic characteristics of any ultimate perfumed article treated therewith.

As used herein the terms "alter" and "modify" in their various forms mean supplying or imparting a perfume aroma character or note to otherwise bland substances or augmenting the existing aroma characteristic where a natural aroma is deficient in some regard or supplementing the existing aroma impression to modify its quality, character or aroma.

As used herein the term "enhance" is intended to mean the intensification (without effecting a change in kind of quality of aroma) of one or more aroma nuances in the organoleptic impression of a perfume, perfume composition or perfumed articles.

The mixture of damascol (phenyl $C_6$ ketone) and beta-cyclohomocitral of our invention and one or more auxiliary perfume ingredients, including, for example, alcohols, aldehydes, nitriles, esters, cyclic esters, and natural essential oils, may be admixed so that the combined odors of the individual components produce a pleasant and desired fragrance, particularly and preferably in rose muguet and other "floral" fragrances. It is to be understood that such additional adjuvants are to be organoleptically compatible with both of said phenyl $C_6$ ketone and beta-cyclohomocitral, and, further, that such adjuvants are to be non-reactive under use conditions at room temperature and storage conditions with said phenyl $C_6$ ketone and said beta-cyclohomocitral.

Such perfume compositions usually contain (a) the main note of the "bouquet" or foundation stone of the compositions; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual components which contribute their particular olfactory characteristics, but also alter, or modify or enhance the over-all effect of the perfume composition will be the sum of the effects of each of the ingredients. Thus, the mixture of the damascol and beta-cyclohomocitral can be used to alter the aroma characteristics of a perfume (or enhance same) for example, by utilizing or moderating the olfactory reaction contributed by another ingredient in the composition.

The amount of mixture of the damascol and beta-cyclohomocitral of our invention which will be effective in perfume compositions depends on many factors, including the other ingredients, their amounts and the effects which are desired. It has been found that perfume compositions containing as little as 0.01% of mixture of damascol and beta-cyclohomocitral and even less (e.g., 0.005%) can be used to impart a rosey or muguet aroma to cosmetics or other products. The amount employed can range up to 10% of the fragrance components and will depend on considerations of cost, nature of the end product, the effect desired on the finished product and the particular fragrance sought.

The mixture of the damascol and beta-cyclohomocitral is useful, taken alone or in perfume compositions as an olfactory component in detergents and soaps, space odorants and deodorants, perfumes, colognes, toilet water, bath preparations, such as bath oils, and bath solids; hair preparations, such as lacquers, brilliantines, pomades and shampoos; cosmetic preparations, such as creams, deodorants, hand lotions and sun screens; powders, such as talcs, dusting powders, face powders and the like. When used as an olfactory component as little as 1% of the damascol-beta-cyclohomocitral mixture will suffice to impart a green, earthy note to petitgrain formulations. Generally, no more than 3% of the damascol-beta-cyclohomocitral mixture based on the ultimate end product is required in the perfume composition.

In addition, the perfume composition or fragrance composition of our invention can contain a vehicle, or carrier for the damascol-beta-cyclohomocitral mixture. The vehicle can be a liquid such as an alcohol, a non-toxic alcohol, a non-toxic glycol, or the like. The carrier can also be an absorbent solid, such as a gum (e.g. gum arabic) or components for encapsulating the composition (such as gelatin).

Examples I-XV illustrate the utility of the damascol-beta-cyclohomocitral mixtures of our invention. It will be understood that these Examples are illustrative and the invention is to be considered restricted thereto only as indicated in the appended claims. All parts and percentages given herein are by weight unless otherwise specified.

EXAMPLE 1

ROSE ESSENCES

The following formulation is prepared:

| Ingredient | Parts by Weight |
|---|---|
| Phenyl Ethyl Alcohol | 1040 |
| Geraniol | 390 |
| Citronellol | 390 |
| Alpha Ionone | 130 |
| Hydroxy Citronellal | 130 |
|  | 2080 |

A. In a first experiment, 208 parts of 4-damascol (2,5-dimethyl-5-phenylhexanone-4) is added to this formulation.

B. In a second experiment, 208 parts of 4-damascol and 52 parts of 10% beta-cyclohomocitral in diethyl phthalate are added to this formulation.

C. In a third experiment, 104 parts of 4-damascol and 52 parts of 10% beta-cyclohomocitral in diethyl phthalate is added to this formulation.

D. In a fourth experiment, 208 parts of damascol (2,5-dimethyl-5-phenylhexen-1-on-3) is added to the above formulation.

E. In a fifth experiment, 208 parts of damascol and 52 parts beta-cyclohomocitral is added to the formulation.

F. In a sixth experiment, 104 parts of damascol and 52 parts of 10% beta-cyclohomocitral in diethyl phthalate is added to the formulation.

The beta-cyclohomocitral significantly improves the rosiness of the formulation when used with the 4-damascol, in Experiments "B" and "C".

The combination of the beta-cyclohomocitral and damascol significantly improves the rosiness of the formulation in Experiments "E" and "F".

EXAMPLE II

PREPARATION OF A SOAP COMPOSITION

100 Grams of soap chips are mixed with one gram of the perfume composition of Example I (Experiment B) until a substantially homogeneous composition is obtained. The perfumed soap composition manifests an excellent rose character.

EXAMPLE III

PREPARATION OF A DETERGENT COMPOSITION

A total of 100 grams of detergent powder is mixed with 0.15 grams of the perfume composition of Example I (Experiment C) until a substantially homogeneous composition is obtained. This composition has an excellent rose aroma.

EXAMPLE IV

PERFUMED LIQUID DETERGENT

Concentrated liquid detergents with a rosey aroma and woody, green and earthy nuances are prepared containing 0.10%, 0.15% and 0.20% of a mixture of beta-cyclohomocitral and damascol having a weight ratio of 2 parts damascol: 1 part beta-cyclohomocitral. They are prepared by adding and homogeneously mixing the appropriate quantity of damascol-beta-cyclohomocitral mixture in the liquid detergent. The detergents all possess an excellent rose fragrance, with woody, green and earthy notes, the intensity increasing with greater concentrations of damascol-beta-cyclohomocitral mixture.

EXAMPLE V

PREPARATION OF A COLOGNE AND HANDKERCHIEF PERFUME

A mixture of damascol and beta-cyclohomocitral (weight ratio: 2 parts damascol: 1 part beta-cyclohomocitral) is incorporated in a cologne at a concentration of 2.5% in 85% aqueous ethanol; and into a handkerchief perfume at a concentration of 20% (in 95% aqueous ethanol). A distinct and definite rosey fragrance with woody, green and earthy notes is imparted to the cologne and to the handkerchief perfume.

EXAMPLE VI

PREPARATION OF A COLOGNE AND HANDKERCHIEF PERFUME

The composition of Example I (Experiment E) is incorporated in a cologne at a concentration of 2.5% in 85% aqueous ethanol; and into a handkerchief perfume at a concentration of 20% (in 95% aqueous ethanol). The use of the damascol-beta-cyclohomocitral mixture in the composition of Example I (Experiment E) affords a distinct and definite strong rose aroma to the handkerchief perfume and cologne.

EXAMPLE VII

PREPARATION OF SOAP COMPOSITION

One hundred grams of soap chips are mixed with 1 gram of a mixture of beta-cyclohomocitral and 4-damascol (ratio of beta-cyclohomocitral:4-damascol is 1:3) until a substantially homogeneous composition is obtained. The perfumed soap composition manifests an excellent rose aroma with woody, green and earthy nuances.

EXAMPLE VIII

PREPARATION OF A DETERGENT COMPOSITION

A total of 100 g of a detergent powder is mixed with 0.15 g of the mixture of beta-cyclohomocitral and 4-damascol (ratio of beta-cyclohomocitral:4-damascol is 1:4) until a substantially homogeneous composition is obtained. This composition has an excellent rose aroma with woody, green and earthy nuances.

EXAMPLE IX

PREPARATION OF A SOAP COMPOSITION

100 Grams of soap chips are mixed with 1 gram of the perfume composition of Example I (Experiment F) until a substantially homogeneous composition is obtained. The perfumed soap composition manifests an excellent rose character.

EXAMPLE X

PREPARATION OF A DETERGENT COMPOSITION

A total of 100 grams of detergent powder is mixed with 0.15 grams of the perfume composition of Example I (Experiment F) until a substantially homogeneous composition is obtained. This composition has an excellent rose aroma.

EXAMPLE XI

PERFUMED LIQUID DETERGENT

Concentrated liquid detergents with long-lasting, strong rose fragrance having woody, green and earthy notes are prepared containing 0.10%, 0.15% and 0.20% of a 1:1 damascol:beta-cyclohomocitral mixture. They are prepared by adding and homogeneously mixing the appropriate quantity of beta-cyclohomocitral-damascol mixture in the liquid detergent. The detergents all possess a rose aroma with woody, green and earthy notes, the intensity increasing with greater concentrations of beta-cyclohomocitral-damascol mixture.

EXAMPLE XII

PREPARATION OF A COLOGNE AND HANDKERCHIEF PERFUME

A 1:1 4-damascol-beta-cyclohomocitral mixture is incorporated in a cologne at a concentration of 2.5% in 85% aqueous ethanol; and into a handkerchief perfume at a concentration of 20% (in 95% aqueous ethanol). A distinct and definite rose fragrance with woody, green and earthy notes is imparted to the cologne and to the handkerchief perfume.

EXAMPLE XIII

PREPARATION OF A COLOGNE AND HANDKERCHIEF PERFUME

The composition of Example I (Experiment F) is incorporated in a cologne at a concentration of 2.5% in 85% aqueous ethanol; and into a handkerchief perfume at a concentration of 20% (in 95% aqueous ethanol). The use of the damascol-beta-cyclohomocitral mixture in the composition of Example I affords a distinct and definite strong rose aroma to the handkerchief perfume and cologne.

EXAMPLE XIV

PREPARATION OF SOAP COMPOSITION

One hundred grams of soap chips are mixed with 1 gram of a 1:1 4-damascol:beta-cyclohomocitral mixture until a substantially homogeneous composition is obtained. The perfumed soap composition manifests an excellent rose aroma with woody, green and earthy nuances.

EXAMPLE XV

PREPARATION OF A DETERGENT COMPOSITION

A total of 100 g of a detergent powder is mixed with 0.15 g of a 1:1 4-damascol:beta-cyclohomocitral mixture until a substantially homogeneous composition is obtained. This composition has an excellent rose aroma with woody, green and earthy nuances.

What is claimed is:

1. A process for altering the aroma of a soap, which comprises adding thereto from 0.005% up to 10% by weight of said soap of a mixture consisting essentially of (i) 2,6,6-trimethyl-1-cyclohexen-1-ylacetaldehyde having the structure:

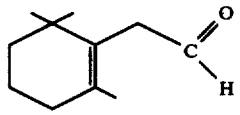

and (ii) at least one phenyl C₆ ketone having the structure:

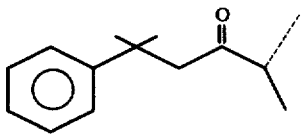

wherein the dashed line represents a carbon-carbon single bond or a carbon-carbon double bond, the ratio of 2,6,6-trimethyl-1-cyclohexen-1-ylacetaldehyde:phenyl C₆ ketone being in the range of from 1:1 up to 1.5.

2. A soap consisting essentially of (i) a mixture consisting essentially of 2,6,6-trimethyl-1-cyclohexen-1-ylacetaldehyde having the structure:

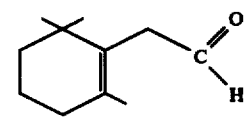

and at least one phenyl C₆ ketone having the structure:

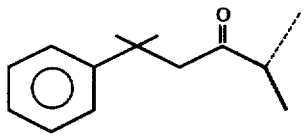

wherein the dashed line represents a carbon-carbon single bond or a carbon-carbon double bond; and (ii) a soap base; the ratio of 2,6,6-trimethyl-1-cyclohexen-1-ylacetaldehyde:phenyl C₆ ketone being in the range of from 1:1 up to about 1:5; and the ratio of said mixtures:-said soap base being 1:100.

* * * * *